UNITED STATES PATENT OFFICE.

ANSON G. BETTS, OF ASHEVILLE, NORTH CAROLINA.

PAINT AND PROCESS OF MAKING SAME.

1,213,330.                Specification of Letters Patent.        Patented Jan. 23, 1917.

No Drawing.        Application filed April 27, 1915.  Serial No. 24,225.

*To all whom it may concern:*

Be it known that I, ANSON G. BETTS, a citizen of the United States, residing at Asheville, in the county of Buncombe and State of North Carolina, have invented certain new and useful Improvements in Paint and Processes of Making Same, of which the following is a full, clear, and exact description.

The invention which forms the subject of my present application relates to paint, and its chief object is to provide a new paint having good body and superior covering power, and drying with a gloss so as to give an "enamel" effect.

To this and other ends my improved paint consists of oil or any other ingredient or ingredients of like nature used in paint, together with barium phosphate. Preferably the phosphate is produced by treating an aqueous solution of barium hydrate or barium sulfid with an aqueous solution of phosphoric acid, either or both of which solutions may be hot in order to facilitate the reaction. It may also be readily produced by decomposing a solution of sodium phosphate with barium sulfid, which has the advantage of giving a valuable by-product, sodium sulfid. The resulting barium phosphate is precipitated, even in the hot solution, and is separated by filteration, after which it is dehydrated by heat, as by calcining. The phosphate is then mixed with the other ingredients of the paint, taking the place, in whole or in part, of zinc oxid, barium sulfate, or other material. Of course the paint may include any suitable colored pigment to give it color. The precipitated phosphate is more easily and satisfactorily handled than the precipitated sulfate, as it shows practically no tendency to form hard cakes in drying and is very easily pulverized and incorporated with oil. The pulverulent or amorphous condition required for use of the material in paint results from the precipitation of the phosphate in finely divided form. The dehydration renders the particles porous, enabling them to absorb a certain amount of the oil in which they are suspended.

I have found that barium phosphate is not only superior to the sulfate in covering power, but that paint so made works easier under the brush and dries with a glossier surface.

The words "dehydrated" and "anhydrous" in the appended claims are not intended to mean that the material is absolutely free from water, as it is evident that some water may be present by absorption from the air after calcining.

What I claim is:

1. Paint containing dehydrated barium phosphate together with a vehicle.

2. Paint containing precipitated and dehydrated barium phosphate and a paint vehicle.

3. Paint containing drying oil and precipitated barium phosphate.

4. As a new product, a mixture containing barium phosphate and a paint oil.

5. As a new product, a mixture containing a drying oil and anhydrous precipitated barium phosphate.

6. As a new product, a paint containing amorphous anhydrous barium phosphate and a paint vehicle.

7. A process of making a paint which comprises treating a solution of a barium compound with a solution of a compound containing the phosphoric acid radical, to precipitate barium phosphate, calcining the barium phosphate and mixing the same with a paint vehicle.

8. A process of making a paint, which comprises dehydrating finely divided barium phosphate, and mixing the same with a paint vehicle.

In testimony whereof I affix my signature.

ANSON G. BETTS.